(12) United States Patent
Wilcox et al.

(10) Patent No.: US 11,249,239 B2
(45) Date of Patent: Feb. 15, 2022

(54) WAVEGUIDE MANAGING HIGH POWER DENSITY

(71) Applicant: IDEAL Industries Lighting LLC, Racine, WI (US)

(72) Inventors: Kurt Wilcox, Libertyville, IL (US); Rick Rothenberger, Youngsville, NC (US)

(73) Assignee: IDEAL Industries Lighting LLC, Sycamore, IL (US)

( * ) Notice: Subject to any disclaimer, the term of this patent is extended or adjusted under 35 U.S.C. 154(b) by 0 days.

(21) Appl. No.: 16/369,138

(22) Filed: Mar. 29, 2019

(65) Prior Publication Data
US 2020/0310022 A1    Oct. 1, 2020

(51) Int. Cl.
    *F21V 8/00* (2006.01)

(52) U.S. Cl.
    CPC ......... *G02B 6/0038* (2013.01); *G02B 6/0016* (2013.01)

(58) Field of Classification Search
    CPC .............................. G02B 6/0038; G02B 6/0016
    See application file for complete search history.

(56) References Cited

U.S. PATENT DOCUMENTS

| | | | |
|---|---|---|---|
| 5,857,770 A * | 1/1999 | Fohl | G02B 6/0018 362/511 |
| 6,464,365 B1 * | 10/2002 | Gunn | G02B 6/0018 349/62 |
| 7,661,865 B2 * | 2/2010 | Baba | G02B 6/002 362/218 |
| 8,425,102 B2 | 4/2013 | Rinko | |
| 9,366,799 B2 | 6/2016 | Wilcox et al. | |
| 9,389,367 B2 | 7/2016 | Yuan et al. | |
| 9,411,086 B2 | 8/2016 | Yuan et al. | |
| 9,464,778 B2 | 10/2016 | Yuan et al. | |
| 9,519,095 B2 | 12/2016 | Wilcox et al. | |
| 9,568,662 B2 | 2/2017 | Lim et al. | |
| 9,581,750 B2 | 2/2017 | Wilcox et al. | |
| 9,581,751 B2 | 2/2017 | Yuan et al. | |
| 9,625,636 B2 | 4/2017 | Durkee et al. | |
| 9,690,029 B2 | 6/2017 | Keller et al. | |
| 9,709,725 B2 | 7/2017 | Wilcox et al. | |
| 9,726,330 B2 | 8/2017 | Wilcox et al. | |

(Continued)

OTHER PUBLICATIONS

International Search Report and the Written Opinion of the International Searching Authority corresponding to International Patent Application No. PCT/US2020/022229 (15 pages) (dated Jun. 18, 2020).

*Primary Examiner* — Jong-Suk (James) Lee
*Assistant Examiner* — Christopher E Dunay
(74) *Attorney, Agent, or Firm* — Withrow + Terranova, P.L.L.C.

(57) ABSTRACT

A waveguide includes a light coupling portion has an interior surface and an exterior surface. The exterior surface includes light coupling features. LEDs emit light into the light coupling features. A light emitting portion has an interior surface and an exterior surface where the exterior surface defines a light emitting surface. The light emitting portion is disposed adjacent the light coupling portion. A light transmission portion optically couples the light coupling portion to the light emitting portion. A footprint of the light coupling portion is substantially the same or less than a footprint of the light emitting portion.

19 Claims, 10 Drawing Sheets

(56) References Cited

U.S. PATENT DOCUMENTS

| | | |
|---|---|---|
| 9,773,760 B2 | 9/2017 | Keller et al. |
| 9,798,072 B2 | 10/2017 | Wilcenski et al. |
| 9,815,424 B2 | 11/2017 | Oku et al. |
| 9,952,372 B2 | 4/2018 | Wilcox et al. |
| 10,042,106 B2 | 8/2018 | Wilcox et al. |
| 2005/0243243 A1* | 11/2005 | Koganezawa ....... G02B 6/0028 349/62 |
| 2006/0114690 A1* | 6/2006 | Iki ........................ G02B 6/0076 362/612 |
| 2008/0232107 A1* | 9/2008 | Hsu ....................... F21V 7/0016 362/277 |
| 2011/0242837 A1 | 10/2011 | Cornelissen et al. |
| 2014/0192550 A1* | 7/2014 | De Zwart ............ G02B 6/0028 362/558 |
| 2015/0003092 A1* | 1/2015 | Gebauer .............. G02B 6/0018 362/511 |
| 2016/0282550 A1* | 9/2016 | Lee ...................... G02B 6/0088 |
| 2018/0024289 A1* | 1/2018 | Fattal .................. G02B 6/0028 362/601 |

* cited by examiner

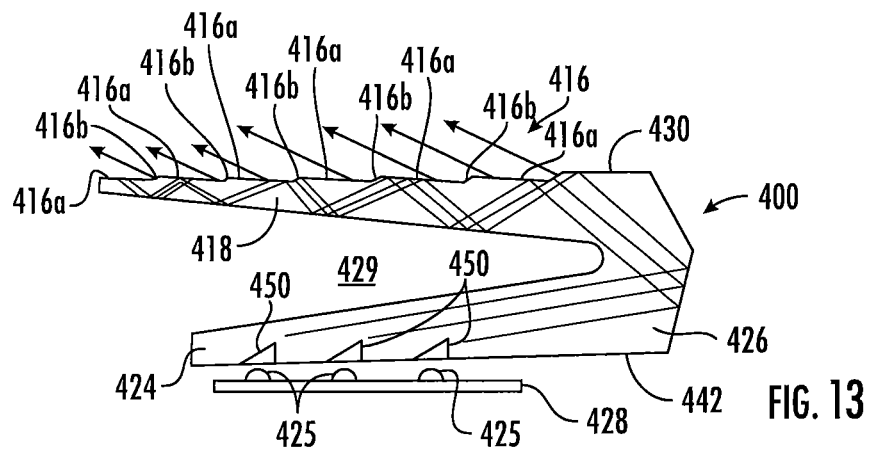
FIG. 13
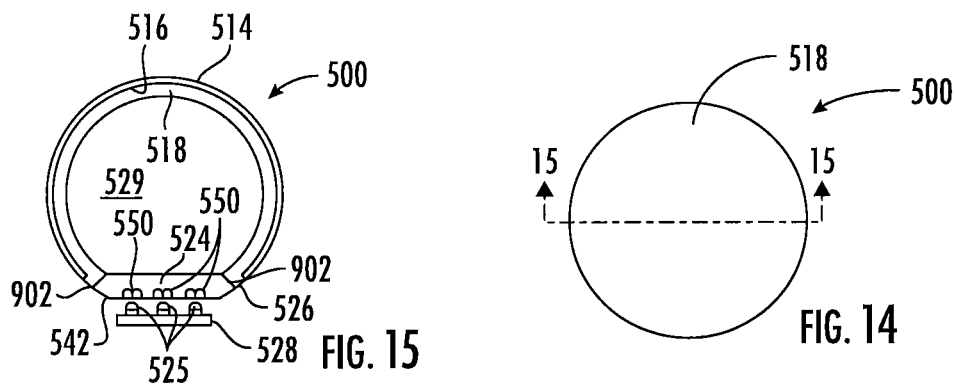
FIG. 15
FIG. 14
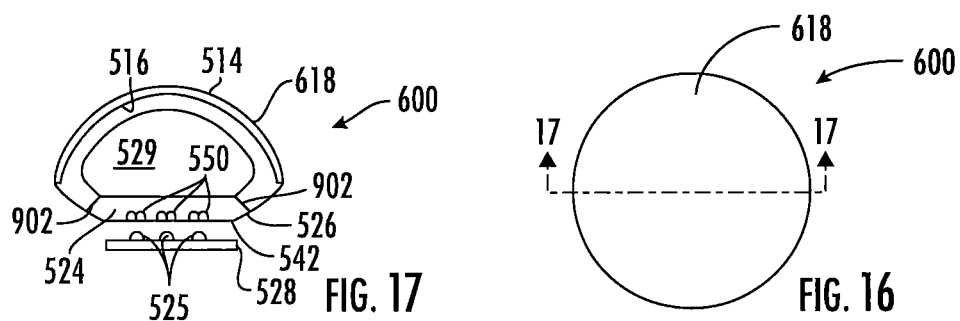
FIG. 17
FIG. 16
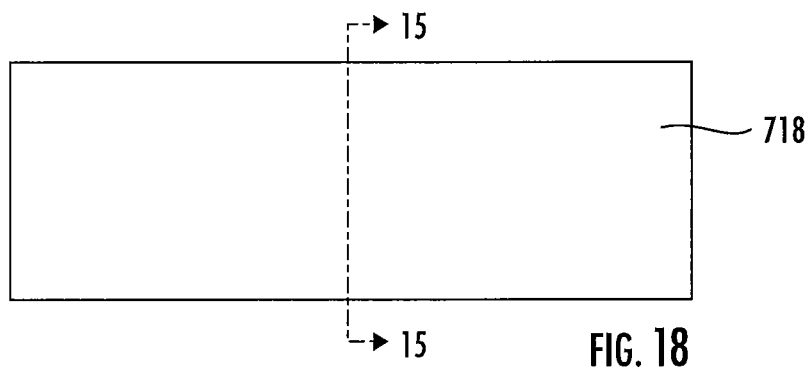
FIG. 18

WAVEGUIDE MANAGING HIGH POWER DENSITY

BACKGROUND

An optical waveguide mixes and directs light emitted by one or more light sources, such as one or more light emitting diodes (LEDs). A typical optical waveguide includes three main components: one or more coupling elements, one or more distribution elements, and one or more extraction elements. The coupling component(s) direct light into the distribution element(s), and condition the light to interact with the subsequent components. The distribution elements control how light flows through the waveguide and are dependent on the waveguide geometry and material. In accordance with well-known principles of total internal reflectance, light traveling through a waveguide is reflected back into the waveguide from an outer surface thereof, provided that the incident light does not exceed a critical angle with respect to the surface. The extraction element(s) determine how light is removed by controlling where and in what direction the light exits the waveguide.

SUMMARY

In some embodiments, a waveguide comprises a light coupling portion having a first surface and a second surface. A plurality of LEDs emits light into the first surface of the light coupling portion. A light emitting portion has a third surface and a fourth surface. The light emitting portion is disposed adjacent the light coupling portion such that the third surface is disposed adjacent the second surface. A light transmission portion optically couples the light coupling portion to the light emitting portion.

A light extraction feature may be provided for extracting light through the fourth surface. The light extraction feature may be on the fourth surface. The light extraction feature may comprise at least one of indents, depressions, facets or holes extending into the fourth surface. The light extraction feature may comprise at least one of bumps, facets or steps rising above the fourth surface. The light coupling portion may have substantially the same area as the light emitting portion. The light coupling portion may have substantially the same footprint as the light emitting portion. The light coupling portion may be substantially coextensive with the light emitting portion. The first surface, the second surface, the third surface and the fourth surface may be substantially parallel to one another. The fourth surface may be a light emitting surface and the first surface may be disposed substantially parallel to the fourth surface where the plurality of LEDs may be spaced over the first surface. The light transmission portion may be substantially annular. Light may be directed radially inwardly from the light transmission portion into the light emitting portion. A second light transmission portion may optically couple the light coupling portion to the light emitting portion.

In some embodiments, a waveguide comprises a light coupling portion having a first interior surface and a first exterior surface where the first exterior surface comprises a plurality of light coupling features. A plurality of LEDs emits light into the light coupling features. A light emitting portion has a second interior surface and a second exterior surface where the second exterior surface defines a light emitting surface. The light emitting portion is disposed adjacent the light coupling portion such that the first interior surface is disposed adjacent the second interior surface. A light transmission portion optically couples the light coupling portion to the light emitting portion.

The light coupling portion and light emitting portion may be separate components connected at an interface. A light extraction feature may extract light through the second exterior surface. The light extraction feature may comprise at least one of indents, depressions, facets or holes extending into the fourth surface and bumps, facets or steps rising above the fourth surface. A footprint of the light coupling portion may be substantially the same or less than a footprint of the light emitting portion. The light coupling portion may be made of a first material and the light emitting region may be made of a second material where the first material is different than the second material. The light emitting portion may be made of glass and the light coupling portion may be made of at least one of acrylic and silicone. A second light transmission portion may optically couple the light coupling portion to the light emitting portion.

BRIEF DESCRIPTION OF THE DRAWINGS

FIG. 13 is a side section view of another embodiment of a waveguide.

FIG. 14 is a top view of another embodiment of a waveguide.

FIG. 15 is a section view taken along line 15-15 of FIG. 14.

FIG. 16 is a top view of another embodiment of a waveguide.

FIG. 17 is a section view taken along line 17-17 of FIG. 16.

FIG. 18 is a top view of another embodiment of a waveguide.

DETAILED DESCRIPTION

Figure 1:
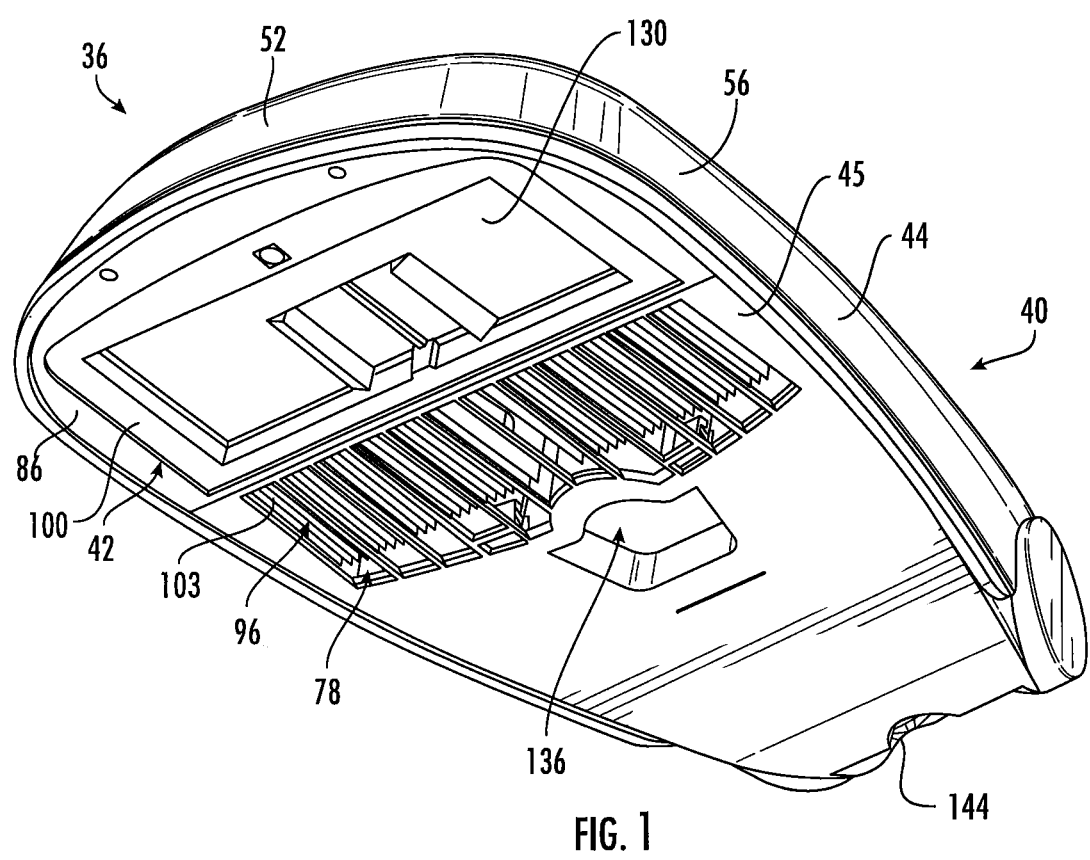
FIG. 1 is a bottom perspective view of an embodiment of a lighting device.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" "comprising," "includes" and/or "including" when used herein, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

It will be understood that when an element such as a layer, region or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "lateral" or "vertical" may be used herein to describe a relationship of one element, layer or region to another element, layer or region as illustrated in the figures. It will be understood that these terms are intended to encompass different orientations of the device in addition to the orientation depicted in the figures.

Embodiments of the invention are described herein with reference to cross-section illustrations that are schematic illustrations of idealized embodiments (and intermediate structures) of the invention. The thickness of layers and regions in the drawings may be exaggerated for clarity. Additionally, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

In the drawings and specification, there have been disclosed typical embodiments of the invention and, although specific terms are employed, they are used in a generic and descriptive sense only and not for purposes of limitation, the scope of the invention being set forth in the following claims.

Figure 2:
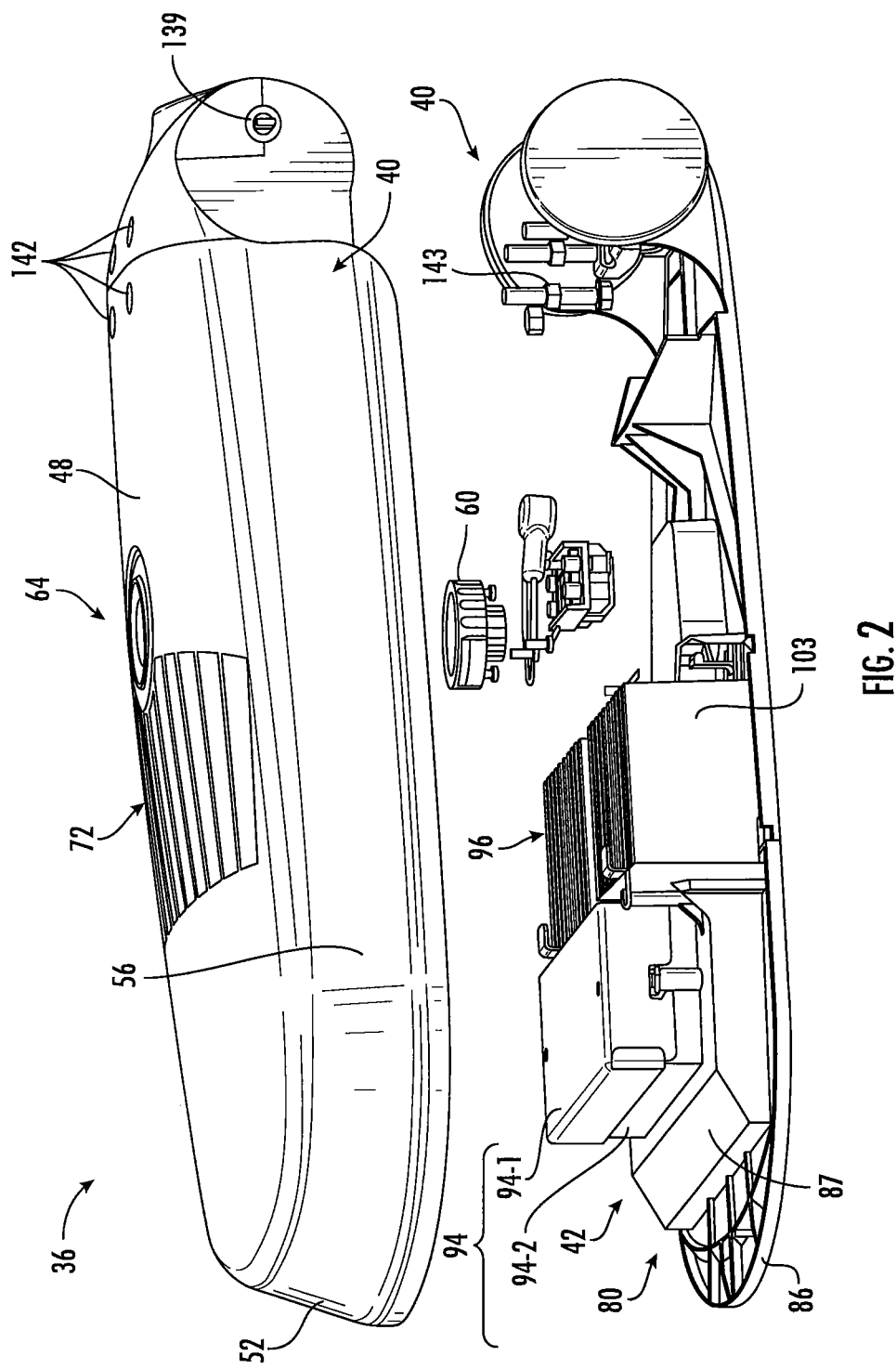
FIGS. 2 and 3 are exploded views of the lighting device of FIG. 1.
Figure 3:
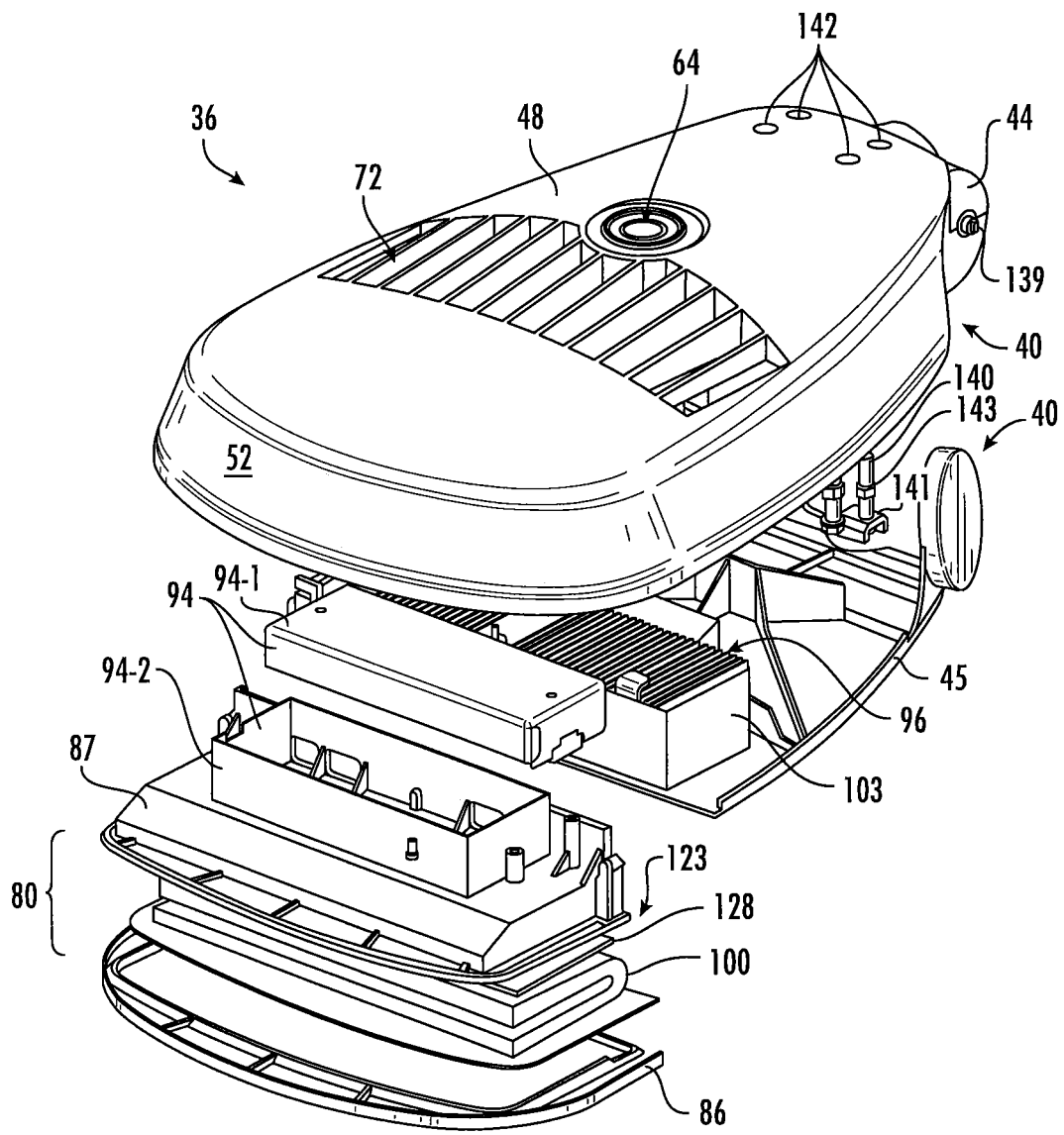

FIGS. 1 through 3 show an embodiment of the waveguide of the invention in an example embodiment of a lighting device 36. While one embodiment of a lighting device is shown and described with reference to FIGS. 1 to 3, lighting devices using the waveguides as disclosed herein may take many other forms and may be used in lighting applications other than as specifically shown and described herein. The lighting device shown and described herein is for explanatory purposes and is not intended to limit the applicability of the waveguides as disclosed herein. Lighting device 36 is suitable for outdoor applications such as in a parking lot or roadway and is capable of being mounted on a stanchion, pole or other support structure. Lighting devices that take advantage of the waveguides disclosed herein may take many other forms.

As shown in FIGS. 1 through 3, the lighting device 36 comprises a housing 40 and a head assembly 42. The housing 40 comprises a top housing portion 44 and a bottom housing portion 45. The top housing portion 44 comprises a top surface 48, a front wall 52, and side walls 56. A communication component 60 such as an RF antenna that senses RF energy, a light sensor or the like may be disposed in a receptacle 64 in the housing 40. The communication component may be located at any suitable position on the lighting device and more than one communication component may be used. An upper convection opening 72 is disposed in the top housing portion 44. The bottom housing portion 45 comprises a lower convection opening 78 disposed below the upper convection opening 72.

The head assembly 42 is at least partially enclosed by the housing 40 and comprises an optical assembly 80. The optical assembly 80 comprises a waveguide 100, a light source 123, a lower frame member 86 partially surrounding the waveguide 100 and forming a barrier between the waveguide 100 and the housing 40, and an upper frame member 87 disposed above the optical waveguide 100. The light source 123 comprises a plurality of LEDs 125 (FIG. 4) supported on an LED board 128 and disposed adjacent the waveguide 100 to direct light into the waveguide 100. The head assembly 42 further comprises a driver housing 94 that contains the LED driver circuit and other lamp electronics 122 (FIG. 4) to drive LEDs 125. A reflective bottom surface of the upper frame member 87 may be disposed adjacent one or more exterior surfaces of the optical waveguide 100.

The LED driver circuit and other lamp electronics 122 may be disposed in the driver housing 94, which is disposed proximal to the LEDs 125 on LED board 128. The driver housing 94 may comprise an upper portion 94-1 and a lower portion 94-2. The upper portion 94-1 forms a top cover of the driver housing 94. Part of the driver housing 94 may be made of a metal capable of efficient heat transfer.

A heat exchanger 96 is included in the housing 40. The heat exchanger 96 may comprise a plurality of fins 103. The fins 103 transfer heat at least by convection through the upper and lower convection openings 72 and 78. The heat exchanger 96 is in thermal communication (via conduction, convection, and/or radiation) with the LEDs 125, LED board 128 and the LED driver circuit and other lamp electronics 122. One or more thermally conductive LED boards 128, such as printed circuit boards (PCBs), receive and mount the LEDs 125 and conduct heat therefrom. The LED boards 128 are preferably made of one or more materials that efficiently conduct heat and are disposed in thermal communication with the heat exchanger 96. Alternative paths may be present for heat transfer between the LED driver circuit and other lamp electronics 122, the LEDs 125, the LED board 128 and the heat exchanger 96, such as a combination of conduction, convection, and/or radiation. In the illustrated embodiments, the upper and lower convection openings 72 and 78 are disposed above and below the heat exchanger 96, respectively, thus providing for efficient heat transfer via a direct vertical path of convection flow.

Figure 4:
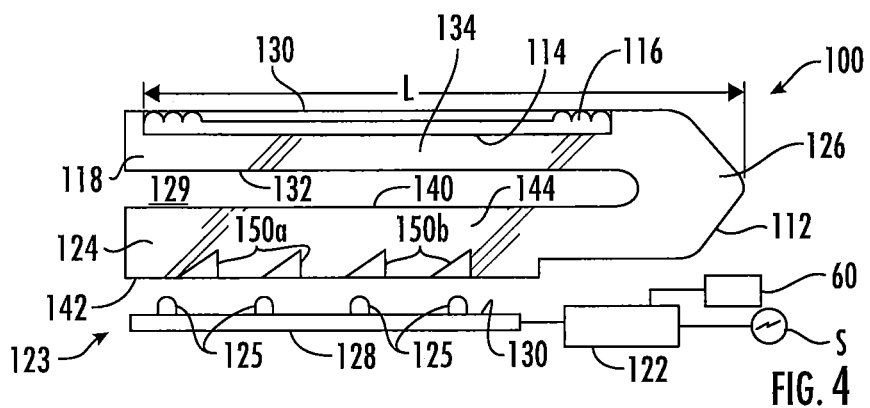
FIG. 4 is a side section view of an embodiment of a waveguide.

The bottom housing portion 45 may be opened by exerting a downward force on handle 136 to disconnect mating snap-fit connectors on the bottom housing portion 45 and the top housing portion 44. Also, as a result of the downward force, the bottom housing portion 45 rotates about pins 139 such that a front portion of the bottom housing portion 45 pivots downward, thus allowing access to the interior of the housing 40. In one embodiment, the lighting device 36 may be placed onto a stanchion such that an end of the stanchion extends through a mounting aperture 144. Fasteners 140, 143 engage fastener bores 142 to secure the stanchion to the housing. Many other mechanisms for supporting a light fixture may also be used. Electrical connections may be made from a power source S to the LED driver circuit and other lamp electronics 122 to power the LEDs 125 (FIG. 4).

Each LED 125 may be a single white LED or multiple white LEDs or each may comprise multiple LEDs either mounted separately or together on a single substrate or package including a phosphor-coated LED either alone or in combination with a color LED, such as a green LED, etc. Details of suitable arrangements of the LEDs and lamp electronics for use in the light fixture are disclosed in U.S. Pat. No. 9,786,639, entitled "Solid State Light Fixtures Suitable for High Temperature Operation Having Separate Blue-Shifted-Yellow/Green and Blue-Shifted-Red Emitters" issued on Oct. 10, 2017, which is incorporated by reference herein in its entirety. In other embodiments, all similarly colored LEDs may be used where for example all warm white LEDs or all cool white LEDs may be used where all of the LEDs emit at a similar color point. In such an embodiment all of the LEDs are intended to emit at a similar targeted wavelength; however, in practice there may be some variation in the emitted color of each of the LEDs such that the LEDs may be selected such that light emitted by the LEDs is balanced such that the lighting device 36 emits light at the desired color point. In the embodiments disclosed herein a various combinations of LEDs of similar and different colors may be selected to achieve a desired color point. Each LED element or module may be a single white or other color LED chip or other bare component, or each may comprise multiple LEDs either mounted separately or together on a single substrate or package to form a module including, for example, at least one phosphor-coated LED either alone or in combination with at least one color LED, such as a green LED, a yellow LED, a red LED, etc. In those cases where a soft white illumination is to be produced, each LED 125 typically may include one or more blue shifted yellow LEDs and one or more red LEDs. The LEDs may be disposed in different configurations and/or layouts as desired. Different color temperatures and appearances may be produced using other LED combinations, as is known in the art. In one embodiment, the light source 123 comprises any LED, for example, an MT-G LED module incorporating TrueWhite® LED technology or as disclosed in U.S. Pat. No. 9,818,919, issued to Lowes et al. on Nov. 14, 2017, entitled "LED Package with Multiple Element Light Source and Encapsulant Having Planar Surfaces" by, the disclosure of which is hereby incorporated by reference herein in its entirety, both as developed by Cree, Inc., the assignee of the present application. In any of the embodiments disclosed herein the LEDs 125 may have a lambertian light distribution, although each may have a directional emission distribution (e.g., a side emitting distribution), as necessary or desirable. More generally, any lambertian, symmetric, wide angle, preferential-sided, or asymmetric beam pattern LED(s) may be used as the light source. Various types of LEDs may be used, including LEDs having primary optics as well as bare LED chips. The LEDs 125 may be disposed in different configurations and/or layouts as desired. Different color temperatures and appearances could be produced using other LED combinations, as is known in the art. For example, a side emitting LED disclosed in U.S. Pat. No. 8,541,795, the disclosure of which is incorporated by reference herein, may be utilized. Still further, any of the LED arrangements and optical elements disclosed in U.S. Pat. No. 9,869,432, filed Dec. 9, 2013, entitled "Luminaires Using Waveguide Bodies and Optical Elements" by Keller et al., which is hereby incorporated by reference herein, may be used.

Referring to FIGS. 4-7, the LEDs 125 are shown mounted on a substrate or LED board 128. The LED board 128 may be any appropriate board, such as a PCB, flexible circuit board, metal core circuit board or the like with the LEDs 125 mounted and electrically interconnected thereon. The LED board 128 can include the electronics and interconnections necessary to deliver power to the LEDs 125. The LED board 128 may provide the physical support for the LEDs 125 and may form part of the electrical path to the LEDs 125 for delivering current to the LEDs 125. If desired, a surface 130 of LED board 128 may be covered or coated by a reflective material, which may be a white material or a material that exhibits specular reflective characteristics. The LED board 128 is secured in fixed relation to the waveguide 100 in any suitable fashion such that the LEDs 125 are disposed opposite to the light coupling portion 124 as will be described.

The LEDs 125 emit light when energized through the electrical path. The term "electrical path" is used to refer to the entire electrical path to the LEDs 125, including an intervening driver circuit and other lamp electronics 122 in the lighting device disposed between the source of electrical power S and the LEDs 125. Electrical conductors (not shown) run between the LEDs 125, the driver circuit and other lamp electronics 122 and the source of electrical power S, such as an electrical grid, to provide critical current to the LEDs 125. The driver circuit and other lamp electronics 122 may be located remotely in driver housing 94, the driver circuit and other lamp electronics 122 may be disposed on the LED board 128 or a portion of the driver circuit and other lamp electronics 122 may be disposed on the LED board 128 and the remainder of the driver circuit and other lamp electronics 122 may be remotely located. The driver circuit and other lamp electronics 122 are electrically coupled to the LED board 128 and are in the electrical path to the LEDs 125. LED lighting systems can work with a variety of different types of power supplies or drivers. For example, a buck converter, boost converter, buck-boost converter, or single ended primary inductor converter (SEPIC) could all be used as driver or a portion of a driver for an LED lighting device or solid-state lamp. The driver circuit may rectify high voltage AC current to low voltage DC current, and regulate current flow to the LEDs. The power source S can be a battery or, more typically, an AC source such as the utility mains. The driver circuit is designed to operate the LEDs 125 with AC or DC power in a desired fashion to produce light of a desired intensity and appearance. The driver circuit may comprise a driver circuit as disclosed in U.S. Pat. No. 9,791,110 issued on Oct. 17, 2017, entitled "High Efficiency Driver Circuit with Fast Response" by Hu et al. or U.S. Pat. No. 9,303,823, issued on Apr. 5, 2016, entitled "SEPIC Driver Circuit with Low Input Current Ripple" by Hu et al., both of which are hereby incorporated by reference herein. The driver circuit may further be used with light control circuitry that controls color temperature of any of the embodiments disclosed herein in accordance with user input such as disclosed in U.S. patent application Ser. No. 14/292,286, filed May 30, 2014, now U.S. Pat. No. 10,278,250, entitled "Lighting Fixture Providing Variable CCT" by Pope et al., which is hereby incorporated by reference herein. Preferably, the light source 123 develops light appropriate for general illumination purposes.

The light emitted by the LEDs 125 is delivered to waveguide 100 for further treatment and distribution of the light as will be described in detail. The waveguide 100 may be used to mix the light emitted by the LEDs 125 and to emit the light in a directional or omnidirectional manner to produce a desired luminance pattern.

Further, any of the embodiments disclosed herein may include one or more communication components 60 forming a part of the light control circuitry, such as an RF antenna that senses RF energy or a light sensor. The communication components may be included, for example, to allow the luminaire to communicate with other luminaires and/or with an external controller such as a wireless remote control. More generally, the control circuitry includes at least one of a network component, an RF component, a control component, and a sensor. The sensor may provide an indication of ambient lighting levels thereto and/or occupancy within the illuminated area. The communication components such as a sensor, RF components or the like may be mounted as part of the housing or lens assembly. Such a sensor may be integrated into the light control circuitry. The communication components may be connected to the lighting device via a 7-pin NEMA photocell receptacle or other connection. In various embodiments described herein various smart technologies may be incorporated in the lamps as described in the following United States patent applications "Solid State Lighting Switches and Fixtures Providing Selectively Linked Dimming and Color Control and Methods of Operating," U.S. Pat. No. 8,736,186, issued May 27, 2014, which is incorporated by reference herein in its entirety; "Master/Slave Arrangement for Lighting Fixture Modules," U.S. Pat. No. 9,572,226, issued Feb. 14, 2017, which is incorporated by reference herein in its entirety; "Lighting Fixture for Automated Grouping," U.S. Pat. No. 9,155,165, issued Oct. 6, 2015, which is incorporated by reference herein in its entirety; "Multi-Agent Intelligent Lighting System," U.S. Pat. No. 8,975,827, issued Mar. 1, 2013, which is incorporated by reference herein in its entirety; "Routing Table Improvements for Wireless Lighting Networks," U.S. Pat. No. 9,155,166, issued Oct. 6, 2015, which is incorporated by reference herein in its entirety; "Commissioning Device for Multi-Node Sensor and Control Networks," U.S. Pat. No. 9,433,061, issued Aug. 30, 2016, which is incorporated by reference herein in its entirety; "Wireless Network Initialization for Lighting Systems," U.S. Pat. No. 8,829,821, issued Sep. 9, 2014, which is incorporated by reference herein in its entirety; "Commissioning for a Lighting Network," U.S. Pat. No. 8,912,735, issued Dec. 16, 2014, which is incorporated by reference herein in its entirety; "Ambient Light Monitoring in a Lighting Fixture," application Ser. No. 13/838,398, filed Mar. 15, 2013, now U.S. Pat. No. 10,161,612, which is incorporated by reference herein in its entirety; "System, Devices and Methods for Controlling One or More Lights," U.S. Pat. No. 9,622,321, issued Apr. 11, 2017, which is incorporated by reference herein in its entirety; and "Enhanced Network Lighting," application Ser. No. 61/932,058, filed Jan. 27, 2014, which is incorporated by reference herein in its entirety. Additionally, any of the light fixtures described herein can include the smart lighting control technologies disclosed in U.S. Application No. 2017/02310668, titled "Automatic Mapping of Devices in a Distributed Lighting Network", filed on Jun. 24, 2016 to Roberts et al. and assigned to the same assignee as the present application, the entirety of this application being incorporated by reference herein.

The lighting device 36 of FIGS. 1-3 is an embodiment of a solid state lighting device suitable for use in outdoor applications; however, the system of the invention may be used in any solid state lighting device. Moreover, while an embodiment of a lighting device is shown and described, the waveguides as disclosed herein may be used in any solid state lighting device including lamps, luminaires, trofferstyle lights, outdoor lighting or the like. The LEDs, waveguide, power circuit and other components may be housed in any suitable housing. The lighting devices described herein may be used for any suitable application in any environment such as interior lighting or exterior lighting. The lighting device may be used as a troffer luminaire, suspended luminaire, recessed lighting, street/road way lighting, parking garage lighting or the like. The housing may be configured for the particular application and the light emitting portion of the waveguide may provide any suitable illumination pattern. Moreover, the number and type of LEDs used, and the total lumen output, color and other characteristics of the lighting device may be adjusted for the particular application.

In different lighting applications, the footprint of the waveguide is limited by the size constraints of the housing containing the waveguide and other lighting device components. For example, some lighting devices are built to fit predetermined standardized sizes. In other applications, such as streetlights, the size of the lighting device is limited by factors such as IP ratings, wind loading, and fixture weight. In other applications the size of the lighting device is limited by custom, aesthetic considerations, architectural considerations or the like. In a typical LED based lighting device, the light output of the lighting device is dictated by the size and number of the LEDs and the power at which the LEDs are operated; however, the greater the number of LEDs and the higher power at which the LEDs are operated, the greater the heat generated by the LEDs. In traditional waveguides, LEDs run at high power concentrate thermal and photonic energy into a small input coupling region of the waveguide, e.g. the edge of an edge lit waveguide. Because heat has a deleterious effect on LED output and life and can adversely affect other components, such as the waveguide, the lumen power density of the LEDs at the input coupling region is limited, thereby limiting the output of the lighting device. While increasing the coupling area may reduce lumen power density, the constraints on increasing the footprint of the lighting device, and therefore the waveguide, limits the expansion of the footprint of the waveguide to an extent necessary to lower the lumen power density. As a result, existing waveguide designs are limited in lumen output by the lumen power densities. Existing lighting devices also may require extensive heat exchanger mechanisms to prevent overheating of the system components. The waveguides disclosed herein reduce the lumen power density at the LED/waveguide coupling interface to substantially reduce overheating without significantly increasing the footprint of the waveguide.

Referring again to FIGS. 4-8, the waveguide 100 comprises a waveguide body 112 that includes a light emitting portion 118, a light coupling portion 124, and a light transmission portion 126. The light emitting portion 118 includes a plurality of light extraction features 116 that extract light out of the waveguide body 112. The light coupling portion 124 is disposed adjacent to, and receives light emitted by, the light source 123 and directs light into the waveguide body 112. The light transmission portion 126 optically couples the light emitting portion 118 to the light coupling portion 124 such that light introduced into the light coupling portion 124 is transmitted to the light emitting portion 118.

Figure 5:
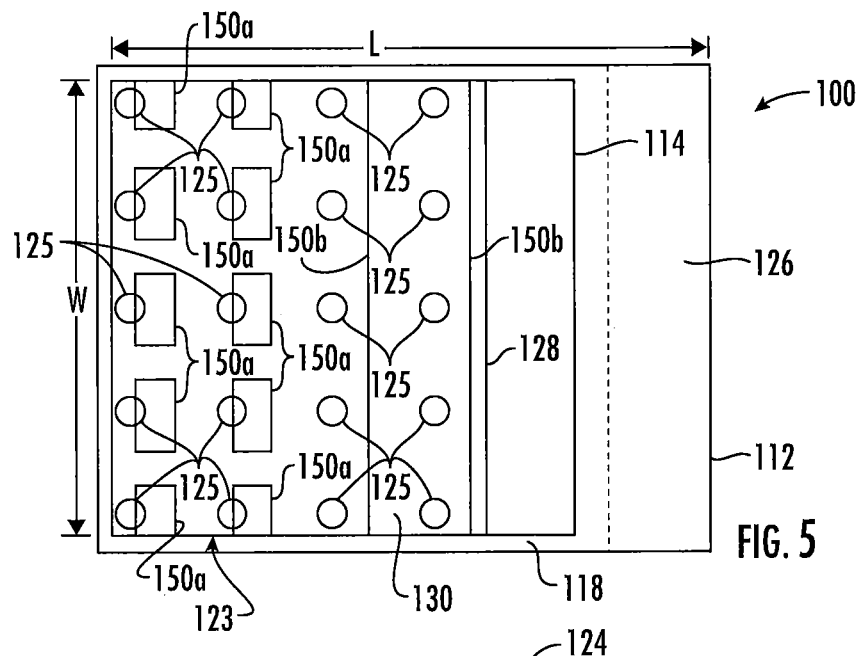
FIG. 5 is a top view of the waveguide of FIG. 4.
Figure 6:
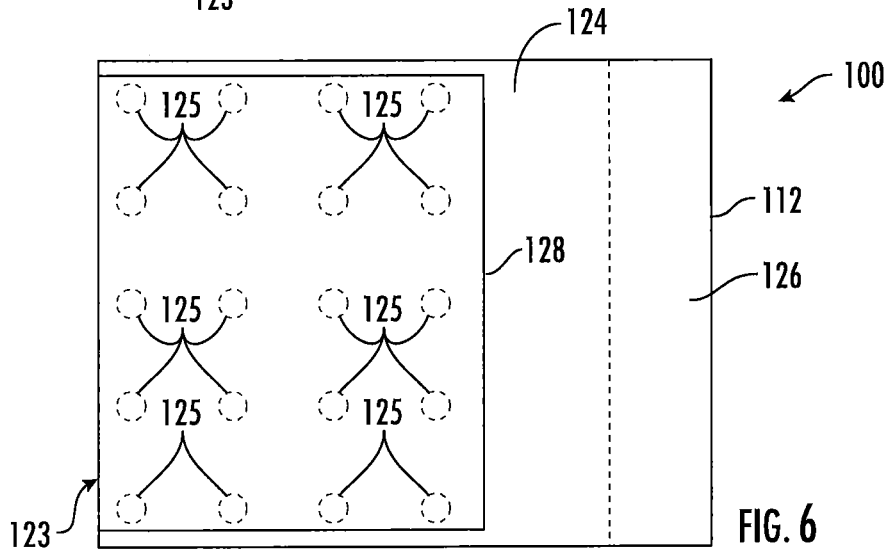
FIG. 6 is a bottom view of the waveguide of FIG. 4.
Figure 7:
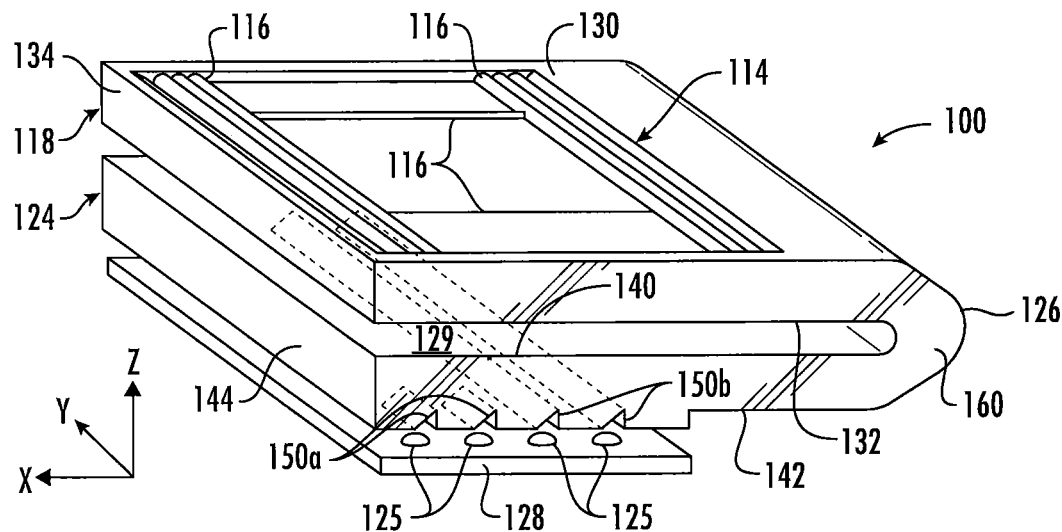
FIG. 7 is a first perspective view of the waveguide of FIG. 4.
Figure 8:
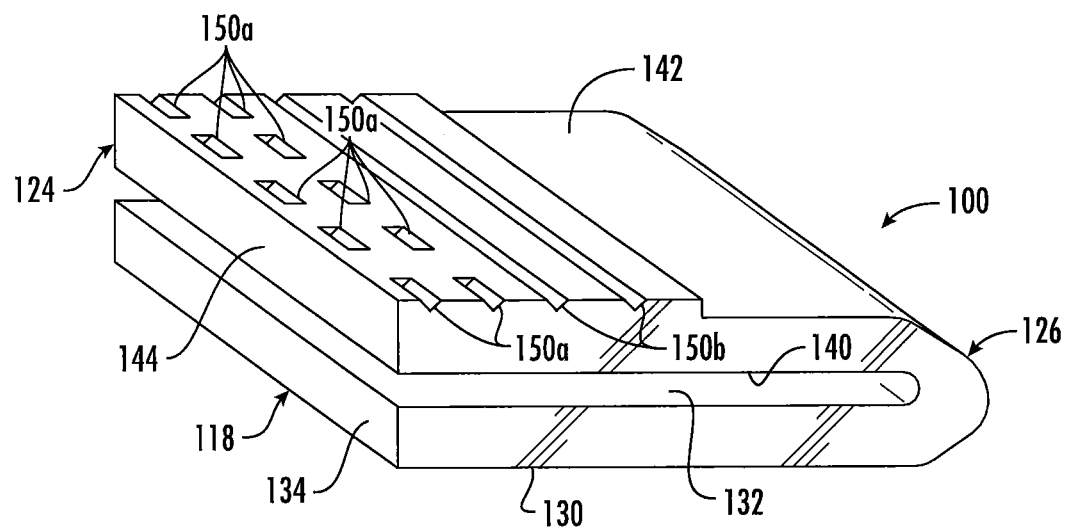
FIG. 8 is a second perspective view of the waveguide of FIG. 4.

The waveguide 100 may be made of any suitable optical grade material that exhibits total internal reflection (TIR) characteristics. The material may comprise but is not limited to acrylic, polycarbonate, glass, molded silicone, or the like. The waveguide 100 has a footprint that may be described, generally, in terms of the area of the waveguide in the plane of the light emitting surface. For example, in the waveguide 100 shown in FIGS. 4-8, the light emitting surface 130 is a generally rectangular area of the light emitting portion 118. The waveguide 100 has a generally rectangular footprint (FIG. 5). The footprint of the waveguide 100 may be slightly greater than the area of the light emitting surface 130 where, for example, as shown in FIG. 4, the light transmission portion 126 extends slightly laterally beyond the light emitting portion 118. For a rectangular waveguide the footprint of the waveguide 100 may be described in terms of its length and width. For example, the area of the footprint of waveguide 100 may be described in terms of its length L and width W, transverse to the length L. While the waveguide 100 shown in FIGS. 4-8 is rectangular, the waveguide may have any suitable shape including round, square, multi-sided, oval, irregular shaped or the like. In these and in other embodiments, the footprint of the waveguide may be expressed in terms other than length and width.

The light emitting portion 118 may be described generally as having an exterior surface 130, an interior surface 132 and a side surface 134. The exterior surface 130 is the light emitting surface. In the illustrated embodiment, the surfaces comprise generally planar walls; however, where the light emitting portion 118 has other than a rectangular shape, the surfaces may be defined in whole or part by curved walls, planar walls, faceted walls or combinations of such walls. One or more of the surfaces of the light emitting portion 118 may be formed with light extraction features 116 to define a light emitting area 114 on light emitting surface 130 (note, the light extraction features 116 are not shown in FIG. 5 in order to more clearly show the light source 123). The light extraction features 116 may be formed on the light emitting exterior surface 130, as shown. Alternatively, the light extraction features may be formed on the interior surface 132 to reflect light to and out of the exterior surface 130. In some embodiments, the light extraction features 116 may be formed on both the exterior surface 130 and the interior surface 132. The light extraction features 116 may also be formed within the waveguide body 112 at positions between the exterior and interior surfaces 130, 132. It is to be understood that in use, the waveguides described herein may assume any spatial orientation and the light emitting surface 130 may be an upper surface of the waveguide, a lower surface of the waveguide and/or a side surface of the waveguide. For example, in FIG. 4 the light emitting surface 130 faces up while in the embodiment of FIGS. 1-3, the light emitting surface 130 faces down to produce downlight. The light extraction features 116 may be designed to emit light from the waveguide in any direction and in any illumination pattern.

Figure 21:
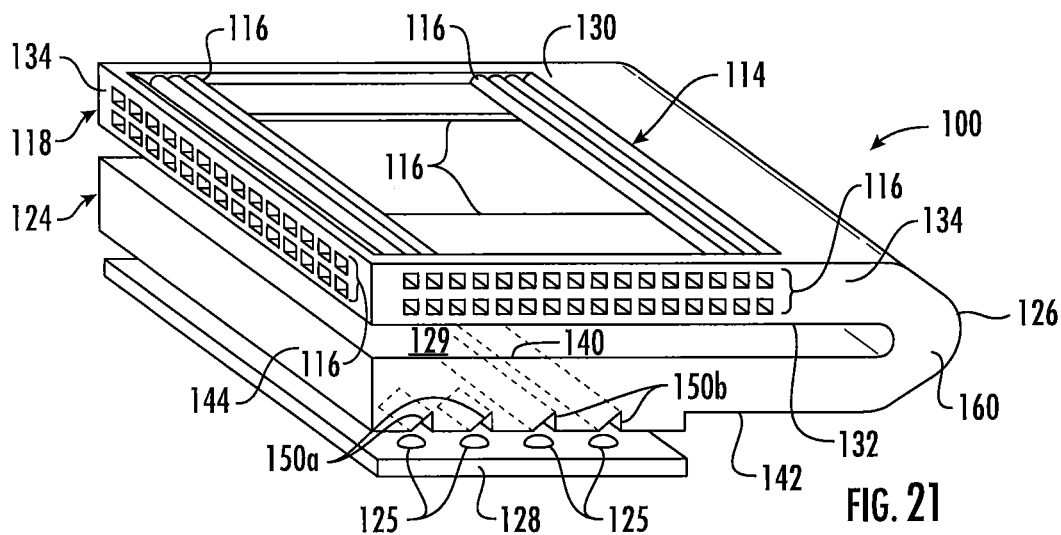
FIG. 21 is a perspective view of another embodiment of the waveguide of Fig.

Referring to FIG. 21, the light extraction features 116 may also be formed on the side surfaces 134 of the light emitting portion 118 such that light may emitted laterally from the waveguide in a direction substantially perpendicular to the direction of the light emitted from surface 134. The side surfaces 134 may form light emitting surfaces in addition to light emitting surface 130 or in place of light emitting surface 130.

The light extraction features 116 can comprise a single light extraction element or a plurality of individual light extraction elements. The size, shape and/or density of individual light extraction features 116 can be uniform or vary across one or more surfaces of the waveguide body 112 in a regular or irregular fashion to produce desired light emission pattern. The light extraction features 116 can comprise indents, depressions, facets or holes extending into the waveguide, or bumps, facets or steps rising above the waveguide surface, or a combination of both bumps and depressions. The light extraction features 116 may be part of the waveguide body 112 or may be coupled to surfaces of the waveguide body 112. Individual light extraction features 116 may have a symmetrical or asymmetrical shape or geometry. The light extraction features 116 can be arranged in an array, and may exhibit regular or irregular spacing. The light extraction features 116 may be applied to the waveguide as part of the molding process of the waveguide body 112, by etching or other process, by application of a film containing the light extraction features or in other manners. One example of light extraction features is described in U.S. Pat. No. 9,835,317 issued to Yuan et al. on Dec. 5, 2017 and entitled "Luminaire Utilizing Waveguide" which is incorporated by reference herein in its entirety. Additionally, the extraction features may comprise small indents, protrusions, and/or reflective materials and/or surfaces as shown in U.S. Pat. No. 9,690,029, issued to Keller et al. on Jun. 27, 2017 and entitled "Optical Waveguides and Luminaires Incorporating Same" which is incorporated by reference herein in its entirety. Light extraction features and light coupling features are also shown in U.S. Pat. No. 9,625,636, issued to Durkee et al. on Apr. 18, 2017 and entitled "Optical Waveguide Bodies and Luminaires Utilizing Same" which is incorporated by reference herein in its entirety. Another example of light extraction features is described in U.S. patent application Ser. No. 15/587,442 filed by Tarsa et al. on May 5, 2017 and entitled "Waveguide-Based Light Sources with Dynamic Beam Shaping," now U.S. Pat. No. 10,527,785, which is incorporated by reference herein in its entirety.

The light coupling portion 124 may be described generally as having an interior surface 140, an exterior surface 142 and a side surface 144. In the illustrated embodiment the surfaces comprise generally planar walls; however, where the light coupling portion 124 has other than a rectangular shape the surfaces may be defined in whole or part by curved walls, planar walls, faceted walls or combinations of such walls. The light coupling portion 124 is arranged such that it is disposed approximately parallel to the light emitting portion 118 in a layered or stacked configuration. In the orientation of the waveguide shown in FIG. 4 the light emitting portion 118 may be described as being over the light coupling portion 124 while in the orientation of the waveguide shown in FIGS. 1-3 the light emitting portion 118 may be described as being under the light coupling portion 124. In any orientation the light emitting portion 118 and the light coupling portion 124 may be described as being in a stacked or layered configuration. The light coupling portion 124 is spaced from the light emitting portion 118 by a narrow air gap 129. In some embodiments, the light coupling portion 124 is closely spaced from the light emitting portion 118 to minimize the height of the waveguide in the z-direction. In this manner, the light coupling portion 124 is arranged back-to-back with the light emitting portion 118. The light coupling portion 124 is disposed adjacent the non-light emitting interior surface 132 of the light emitting portion 118 such that the light coupling portion 124 does not interfere with light emitted from the light emitting portion 118.

As is evident from FIGS. 4-8, the light coupling portion 124 has substantially the same area as the light emitting portion 118 and is arranged to be substantially coextensive with the light emitting portion 118 such that the light coupling portion 124 does not increase the footprint of the waveguide relative to the light emitting portion 118. In some embodiments, the light coupling portion 124 may have a smaller footprint than the light emitting portion 118 provided the lumen density at the coupling face does not create overheating conditions for the system components. Moreover, in some embodiments, the light coupling portion 124 may have a larger footprint than the light emitting portion provided that the increase in footprint is not an issue in the lighting device. However, in some preferred embodiments, the footprint of the light coupling portion 124 is equal to or smaller that the footprint of the light emitting portion 118 such that the overall footprint of the waveguide is not increased. Moreover, the light emitting portion 118 and light coupling portion 124 may have different shapes. While the arrangement of the light coupling portion 124 may not increase the footprint of the waveguide, the entire exterior surface 142 of the light coupling portion 124 may be used as the coupling surface for the LEDs 125. As shown in FIGS. 4-8, an array of LEDs 125 may be positioned to input light into the light coupling portion 124 over substantially the entire exterior surface 142 thereof. The spacing of the LEDs 125 may be increased over a traditional edge lit waveguide and a greater number of LEDs operated at higher power may be used while still maintaining or decreasing the lumen power density of the device. Whether the footprint of the light coupling portion 124 is smaller than, larger than, or substantially the same as the footprint of the light emitting portion 118, the arrangement of the light guide as described herein can be used to control the routing of the light through the waveguide to produce any mixture of light output patterns. The direction, intensity and lumen density of the light may be managed simultaneously using the waveguide arrangements as described herein.

Each of the LEDs 125 may be optically coupled to the light coupling portion 124 by light coupling features 150a, 150b. The light coupling features 150a are arranged in a one-to-one relationship with the LEDs 125 while the light coupling features 150b optically couple more than one LED 125 to the waveguide 100. In some embodiments, all of the light coupling features may be in a one-to-one relationship with the LEDs, and in other embodiments, all of the light coupling features may be coupled to plural LEDs. The number, spacing and pattern of the LEDs 125 and of light coupling features 150a, 150b may be different than as shown herein. Light may be coupled into the waveguide through an air gap and a coupling cavity defined by surfaces located at an edge and/or interior portions of the waveguide. Such surfaces comprise an interface between the relatively low index of refraction of air and the relatively high index of refraction of the waveguide material. One way of controlling the spatial and angular spread of injected light is by fitting each source with a dedicated lens. These lenses can be disposed with an air gap between the lens and the coupling optic, or may be manufactured from the same piece of material that defines the waveguide's distribution element(s). The light coupling features may differ from those disclosed herein and may be used provide directional light into the waveguide.

Figure 20:
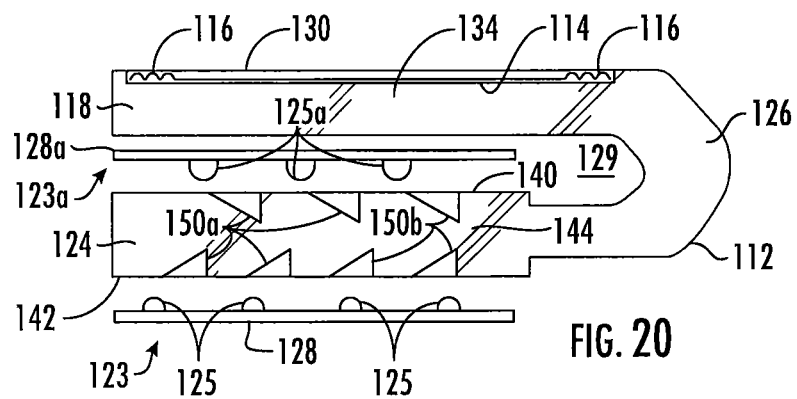
FIG. 20 is a side section view of another embodiment of a waveguide.

As shown in FIGS. 4-8, the LEDs 125 are placed adjacent the exterior surface 142 of the light coupling portion 124 to allow access to the LEDs 125 and to simplify manufacturing; however, the LEDs 125 may be arranged in the air gap 129 between the light coupling portion 124 and the light emitting portion 118. In such an arrangement, the LEDs are arranged opposite the interior face 140 of the light coupling portion 124 to direct light into the light coupling portion 124. In other embodiments, the LEDs may be arranged adjacent both the exterior surface 142 of the light coupling portion 124 and in the air gap 129 between the light coupling portion 124 and the light emitting portion 118. As shown in FIG. 20, in such an arrangement, a second light source 123a is arranged in space 129 such that the LEDs 125a of the second light source 123a are arranged opposite the internal face 140 of the light coupling portion 124. The light source 123a may be powered as previously described with respect to light source 123. Light coupling features 150a, 150b may be provided in face 140 to couple LEDs 125a to the waveguide. Using a first light source 123 and a second light source 123a increases the light directed into the waveguide and increases the over-all lumen output at the light emitting portion 134.

Regardless of the type of light coupling features used, the entire surface 142 of the light coupling portion 124 is available to couple the LEDs 125 to the waveguide. As shown in the embodiment of FIGS. 4-8, the light coupling surface 142 extends substantially parallel to the light emitting surface 130 such that the area of the light coupling surface is approximately the same as the area of the light emitting surface 130. It is to be understood that in some embodiments, the light emitting portion 118 and the light coupling portion 124 may be tapered or curved such that the light coupling portion 124 and the light emitting portion 118 may not be parallel in the strictest sense and may have slightly different areas even where the footprints of the light coupling portion 124 and the light emitting portion 118 are the same.

The waveguide 100 is arranged such that the light coupling surface 142 is a major surface of the waveguide. As explained above, the light coupling portion 124 has major interior and exterior surfaces connected by much smaller side or edge surfaces. The areas of the major interior and exterior surfaces are significantly greater than the area of the side edge surfaces such that using one of the major surfaces of the waveguide as the light coupling surface 142 greatly reduces the density of the LEDs 125.

The light transmission portion 126 optically couples the light coupling portion 124 to the light emitting portion 118. The light transmission portion 126 transmits the light from the light coupling portion 124 to the light emitting portion 118 and may be used to condition the light. For example, the light transmission portion 126 may be used to color mix the light and to eliminate hot spots. In the embodiment of FIGS. 4-8, the light transmission portion 126 comprises a curved or angled section of the waveguide body that bends back over itself to transmit the light from an edge of the light coupling portion 124 to an edge of the light emitting portion 118.

The light may be transmitted through the light coupling portion 124, the light transmission portion 126 and the light emitting portion 118 using total internal reflection (TIR) principles. Total internal reflection occurs when a propagating wave strikes a medium boundary at an angle larger than a particular critical angle with respect to the normal to the surface. If the refractive index is lower on the other side of the boundary and the incident angle is greater than the critical angle, the wave cannot pass through and is entirely reflected. In the waveguide 100 TIR principles may be used to transmit the light through the waveguide. However, in some embodiments reflectors may be used. For example, reflectors or a reflective material may be disposed over all a part of the light transmission portion 126 and over parts of the light coupling portion 124 and the light emitting portion 118. The reflective material may comprise a specular layer, a white optic layer or the like and may comprise a film, paint, a physical layer or the like.

In addition to increasing the area of the light coupling surface 142, the waveguides as described herein also increase the functional light path of the light traveling from the light coupling features 150 to the light extraction features 116. As is evident from FIGS. 4-8, the light path includes some, or all, of the light coupling portion 124, some, or all, of the light emitting portion 118 as well as the length of the light transmission portion 126. The light path is increased while maintaining a minimum footprint of the waveguide. While the z-dimension of the waveguide is increased, the x, y dimensions (as represented by width W and length L in FIG. 5) are not increased and typically the x, y dimensions are the critical dimensions in lighting device design.

Figure 22:
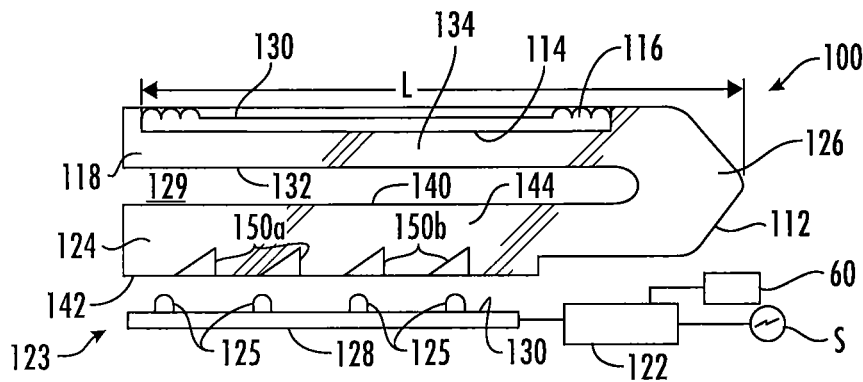
FIG. 22 is a side section view of another embodiment of a waveguide.

In some embodiments, one or more of the light coupling portion 124, the light transmission portion 126 and the light emitting portion 118 may be provided with internal light altering features 133 for diffusing and/or reflecting the light as shown in FIG. 22. These internal light altering features 133 may comprise gas voids (such as air "bubbles"), discrete elements such as diffusive and/or specular reflective particles suspended in or dispersed throughout the waveguide body or other reflective, diffusive or refractive elements such as elongated features. The light altering features 133 may be of any suitable shape and size, and each of the light altering features may be of the same or different shapes and sizes as other ones of the light altering features. The light altering features 133 may be dispersed uniformly or non-uniformly in the wave guide body to alter the path of travel of the light through the waveguide body and to alter the light pattern of the emitted light. In some embodiments, one section of the waveguide body, such as the light emitting portion, may have the light altering features while other sections of the waveguide body, such as the light coupling portion, may not have the light altering features. Moreover, the density of the light altering features may be uniform or non-uniform throughout the waveguide.

Figure 9:
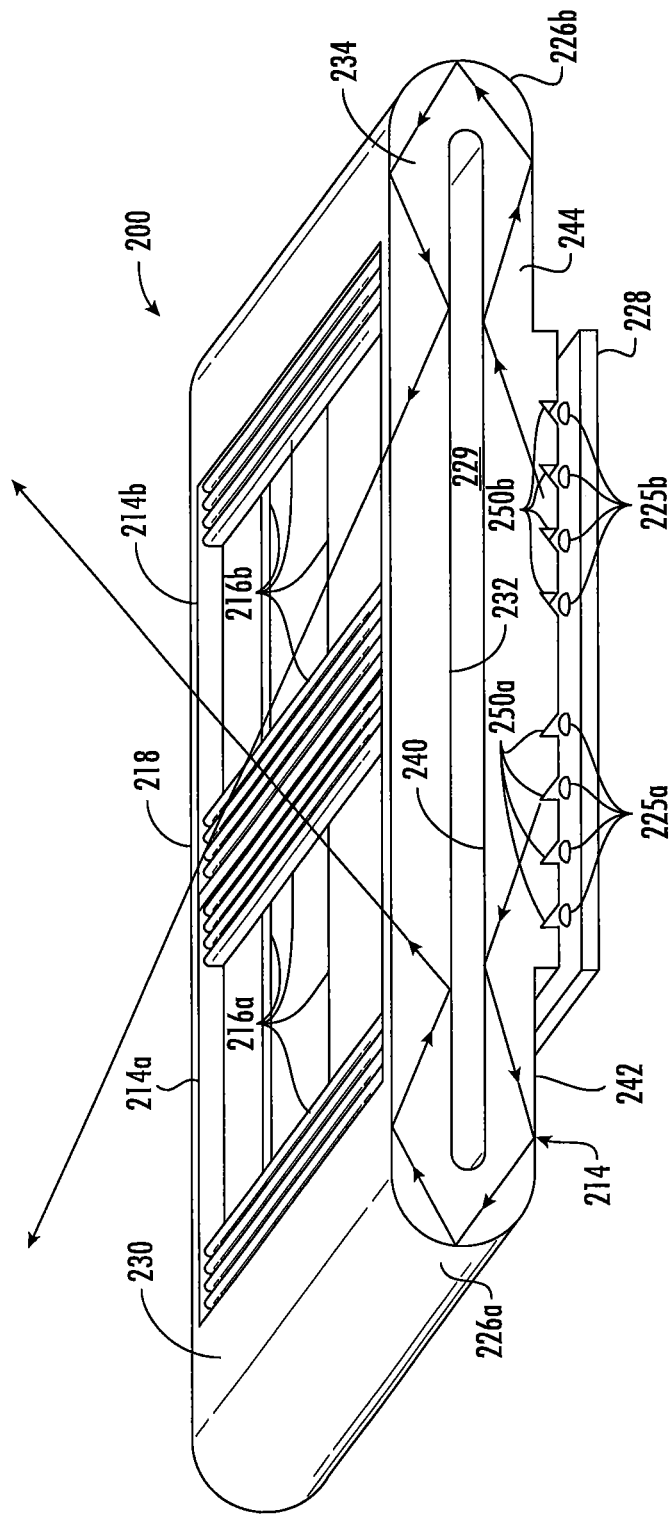
FIG. 9 is a perspective view of another embodiment of the waveguide.

Referring to FIG. 9, another embodiment of a waveguide 200 is illustrated. The embodiment of FIG. 9 is similar to that described above with reference to FIGS. 4-8 except that the LEDs 225a, 225b and light coupling features 250a, 250b are arranged in multiple groups and the light from each group is transmitted through opposing light transmission sections 226a, 226b such that the light of the two groups enters the light emitting portion 218 from opposite ends and in opposite directions. The light emitting portion 218 may be described generally as having an exterior surface 230, an interior surface 232 and side or edge surfaces 234. In the illustrated embodiment, the surfaces comprise generally planar surfaces; however, where the light emitting portion 218 has other than a rectangular shape these surfaces may be defined in whole or part by curved walls, planar walls, faceted walls or combinations of such walls.

One or more of the surfaces of the light emitting portion may be formed with two groups of light extraction features 216a, 216b to define light extraction areas 214a, 214b. In the illustrated embodiment, the light extraction features 216a, 216b are formed on the exterior surface 230 to direct light out of the exterior surface 230. Exterior surface 230 is the light emitting surface. Alternatively, the light extraction features may be formed on the interior surface 232 such that the light extraction features redirect the light to the exterior surface 230. The light extraction features may also be formed between the interior surface 232 and the exterior surface 230. Further, the light extraction features 216a, 216b may be directional such that the light extraction area 214a directs light in a first direction, to the right as viewed in FIG. 9, and the light extraction area 214b directs light in a second direction, to the left as viewed in FIG. 9. The light extraction features 216a, 216b may be configured as previously described.

The light coupling portion 224 may be described generally as having an interior surface 240, an exterior surface 242 and edge or side surfaces 244. In the illustrated embodiment, the surfaces comprise generally planar surfaces; however, where the light coupling portion 224 has other than a rectangular shape these surfaces may be defined in whole or part by curved walls, planar walls, faceted walls or combinations of such walls. The light coupling portion 224 is arranged such that it is disposed approximately parallel to and spaced closely from the light emitting portion 218 by an air gap 229. In this manner the light coupling portion 224 is arranged back-to-back with the light emitting portion 218. The light coupling portion 224 is disposed adjacent the non-light emitting surface 232 of the light emitting portion 218 such that the light coupling portion 224 does not interfere with light emitted from the light emitting portion 218. As is evident from FIG. 9, the light coupling portion 224 has substantially the same area as the light emitting portion 218 and is arranged to be substantially coextensive with the light emitting portion 218 such that the light coupling portion does not increase the footprint of the waveguide relative to the light emitting portion. While the light coupling portion does not increase the footprint of the waveguide, the entire lower surface 242 of the light coupling portion 214 may be used as the coupling surface for the LEDs 225a, 225b.

As shown in FIG. 9, a first array of LEDs 225a may be positioned to input light into the light coupling portion 224 over a first section of the exterior surface 242 thereof and a second array of LEDs 225b may be positioned to input light into the light coupling portion 224 over a second section of the exterior surface 242 thereof. In the illustrated embodiment, the number and spacing of the LEDs 225a, 225b is approximately equal; however, the two groups of LEDs may differ in size, number of LEDs, spacing of LEDs, types of LEDs, or the like. The spacing of the LEDs may be increased over a traditional edge lit waveguide and a greater number of LEDs operated at higher power may be used while still maintaining or decreasing the lumen power density.

Each of the LEDs 225a, 225b may be optically coupled to the light coupling portion by light coupling features 250a, 250b, respectively. The light coupling features 250a, 250b may be arranged in a one-to-one relationship with the LEDs or a single light coupling feature may be used to optically couple multiple LEDs to the waveguide, as previously described. Regardless of the type of light coupling feature used, the entire surface 242 of the light coupling portion 218 is available to couple the LEDs 225a, 225b to the waveguide. The light coupling features may be configured such that the light emitted from the first group of LEDs 225a is directed in a different direction than the light emitted from the second group of LEDs 225b. As shown in FIG. 9, the light from LEDs 225a is directed to the left and the light from LEDs 225b is directed to the right.

Optically coupling the light coupling portion 214 to the light emitting portion 218 are two light transmission portions 226a, 226b, one arranged at each end of the light emitting portion and the light coupling portion such that light emitted from LEDs 225a is transmitted through light coupling portion 226a and light emitted from LEDs 225b is transmitted through light coupling portion 226b. The light enters the light emitting portion 218 from opposite ends thereof and travels through the light emitting portion in opposite directions as represented by arrows in FIG. 9. The light extraction features 216a, 216b may be arranged such that light traveling through light emitting portion 218 in the first direction is emitted generally in the first direction and light traveling through light emitting portion 218 in the second direction is emitted generally in the second direction. Because the light is emitted in the same general direction as it is traveling through the light emitting portion 218 optical efficiency of the waveguide is increased as compared to a system where a portion of the light must be reversed against its direction of travel. The arrangement described with respect to FIG. 9 may be used to generate a bi-directional light pattern with greater efficiency than if one of the directional light patterns had to be turned against its input direction. It is noted that the light extraction features may be selected to generate any light pattern including for example, a narrow beam angle spot light, wide beam angle flood light or the like. The illumination pattern may be directionally asymmetrical or it may be directionally symmetrical.

Figure 10:
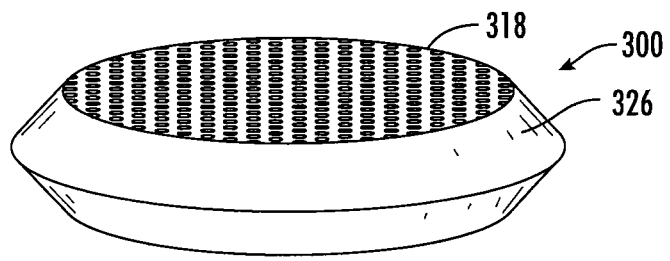
FIG. 10 is a perspective view of another embodiment of the waveguide.
Figure 11:
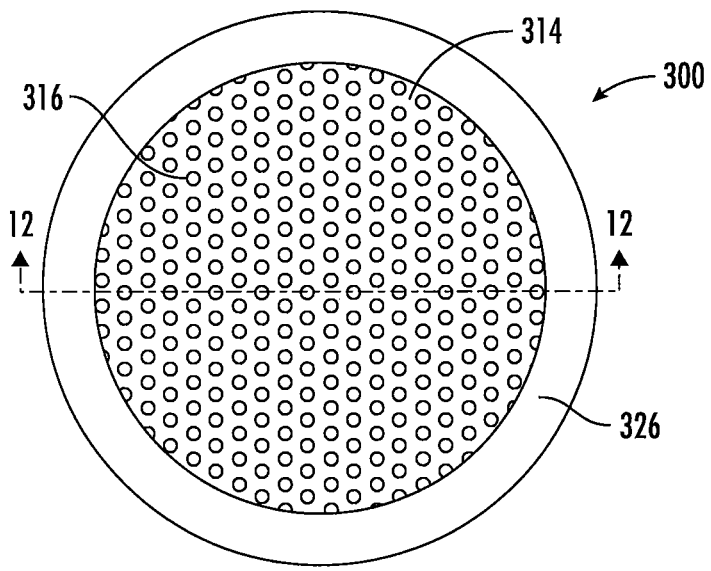
FIG. 11 is a top view of the waveguide of FIG. 10.
Figure 12:
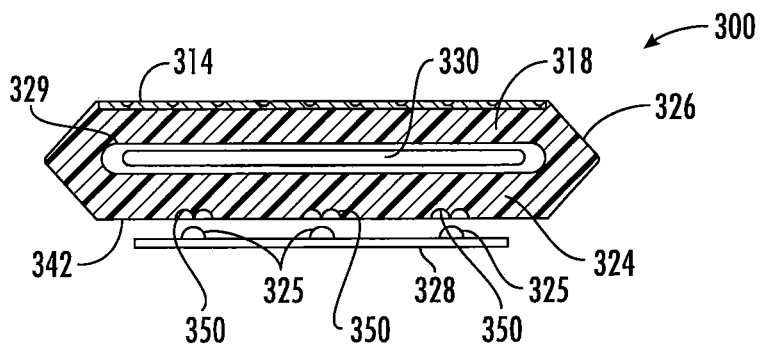
FIG. 12 is a side section view of the waveguide of FIG. 10.

Another embodiment of the waveguide of the invention is shown in FIGS. 10-12. In this embodiment, the waveguide 300 has a generally circular footprint where the light coupling portion 324 and the light emitting portion 318 are generally cylindrical in shape. Light is emitted into the generally circular light coupling surface 342 of light coupling portion 324 by LEDs 325 mounted on LED board 328. The light may be directed into light coupling features 350. The light is directed radially outwardly in the light coupling portion 324. The light is transmitted to a generally annular light transmission portion 326. The light transmission portion 326 transmits the light into the outer periphery of the circular light emitting portion 318 and the light is directed radially inwardly by the light transmission portion 326. The light emitting portion 318 has a light emitting surface 314 that includes light emitting features 316. The light may be emitted from the light emitting portion 318 in any suitable pattern. In this and in any of the other embodiments described herein a reflector 330 may be positioned between the light emitting portion 318 and the light coupling portion 324 to optically isolate these portions from one another. As in the other embodiments described above, the light emitting portion 318 is arranged in a layer above the light coupling portion 324 and the two layers are separated by a small air gap 329. While the embodiment shown in FIGS. 10-12 is circular, the lighting device may be oval, rectangular or irregularly shaped where the light is projected radially inwardly into the light emitting portion from the periphery of the light emitting portion 318 by the light transmission portion 324.

Another embodiment of the waveguide of the invention is shown in FIG. 13. In this embodiment, the waveguide 400 has a generally rectangular footprint where the light coupling portion 424 and the light emitting portion 418 are generally rectangular in shape. The light coupling portion 424, light emitting portion 418 and the light transmission portion 426 are generally arranged as explained with respect to the embodiment of FIGS. 4 through 8; however, the light coupling portion 424 is arranged to generate collimated light and the light emitting portion 418 tapers from the light transmission portion 418 to its distal end. Light is emitted into the light coupling surface 442 of light coupling portion 424 by LEDs 425 mounted on LED board 428. The light may be directed into light coupling features 450. As in the other embodiments described above, the light emitting portion 426 is arranged in a layer above the light coupling portion 424 and the two layers are separated by an air gap 429. A light transmission portion 426 optically connects the light emitting portion 418 and the light coupling portion 424 as previously described. In this embodiment, the light emitting portion 418 comprises a light emitting surface 430 formed by light emitting features 416 comprising a plurality of stepped faces 416a connected by intermediate surfaces 416b that may be planar, curved, concave, scalloped or the like.

Another embodiment of the waveguide of the invention is shown in FIGS. 14 and 15. In this embodiment, the waveguide 500 may have a generally circular footprint, as shown, or it may have a rectangular footprint. Light is emitted into the light coupling surface 542 of light coupling portion 524 such that the light is directed radially outwardly from the light coupling portion 524. Light is emitted into the generally circular light coupling surface 542 of light coupling portion 524 by LEDs 525 mounted on LED board 528. The light may be directed into light coupling features 550. The light is transmitted to a generally annular light transmission portion 526. The light transmission portion 526 transmits the light into the edge of a dome shaped light emitting portion 518. The light emitting portion 518 has a light emitting surface 514 formed by light emitting features 516 as described above. The light may be emitted from the light emitting portion 518 in any suitable pattern; however, with the dome style light emitting portion the light may be emitted nearly omnidirectionally. As in the other embodiments described above, the light emitting portion 518 is arranged in a layer above the light coupling portion 524 and the two layers are separated by an air gap 529. FIGS. 16 and 17, show another embodiment of a waveguide 600 that is similar to the waveguide of FIGS. 14 and 15 (where like reference numbers are used to identify the same elements) except that the light emitting portion 618 is formed as a shallower dome and is more closely spaced to the light coupling portion 524.

Another embodiment of the waveguide of the invention is shown in FIG. 18. The waveguide that is similar to the waveguide of FIGS. 14-17 (where like reference numbers are used to identify the same elements) except that the light coupling portion, light emitting portion 618 and the light transmission portion extend linearly to create an elongated, linear waveguide. It should be noted that in this and in the other embodiments described herein the relative dimensions of the waveguide in the x, y, z directions may be different than as shown, such that the waveguides may be relatively longer, wider or narrower than as specifically shown herein. For example, the width dimension W, as shown in FIG. 5, may be increased relative to the length L to create a linear waveguide.

In the embodiments described above, the light coupling portion, light emitting portion and the light transmission portion are formed as part of an integral, one-piece waveguide. In the embodiments described above, the waveguide may be made of a single piece of material or the waveguide may be made of separate pieces connected together to create the unitary structure. For example the light emitting portion, the light coupling portion and the light transmission portion may be molded as a single piece. In other embodiments, the light coupling portion and the light transmission portion may be molded as a single piece and the light emitting portion may be molded as a separate piece. The pieces may be designed specifically to be optically coupled to one another to create a finished waveguide.

Figure 19:
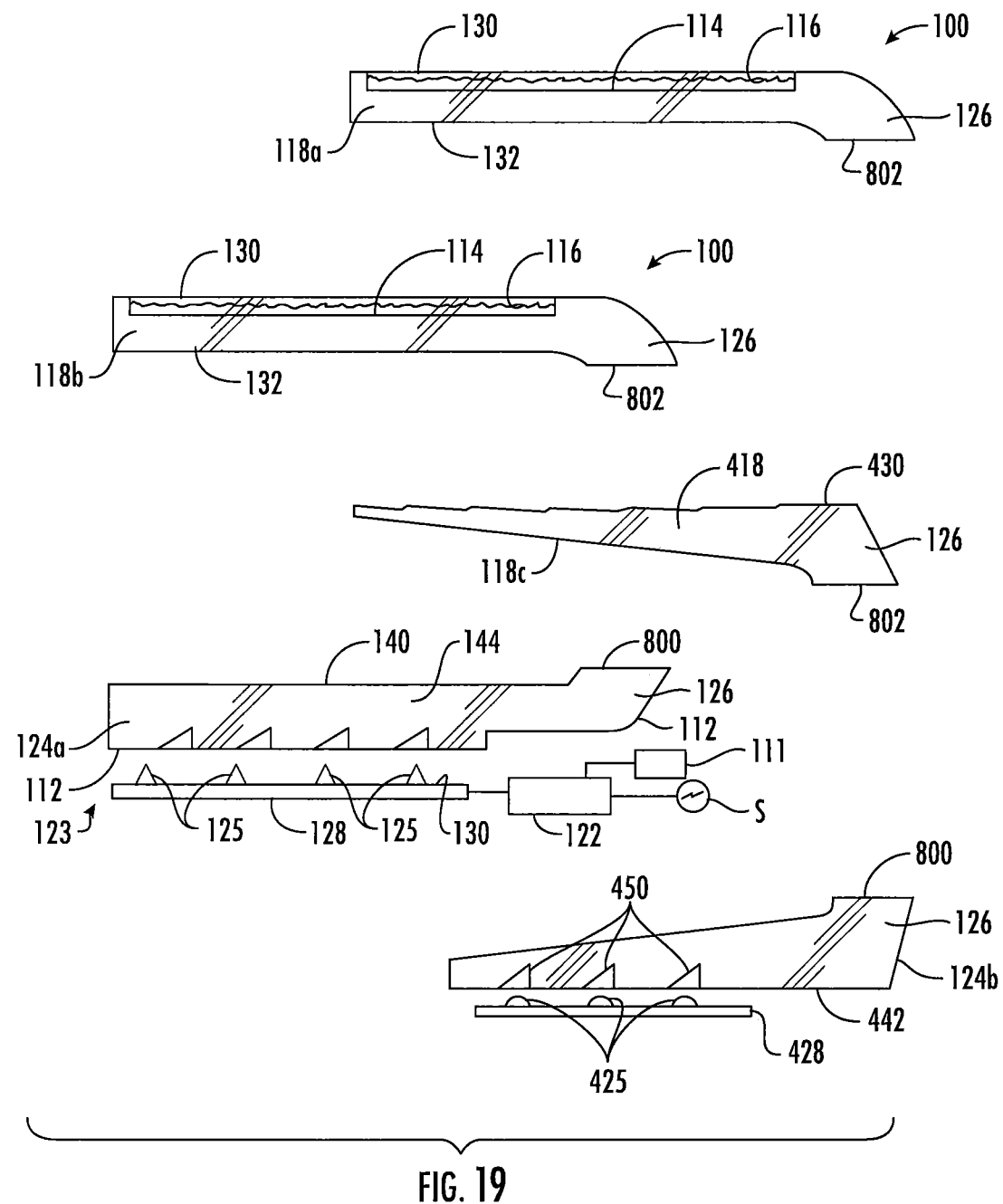
FIG. 19 shows side section views of waveguide components of a modular waveguide system.

However, in other embodiments, a standardized light coupling portion may be designed to be used with multiple different types of light emitting sections as shown in FIG. 19. In such embodiments, the light coupling portion 124a may be formed separately from a plurality of the light emitting portions 118a, 118b, 118c such that the light coupling portion 124a may be optically connected to any one of a plurality of light emitting portions. In the illustrated embodiment each of the light coupling portion 124a and the light emitting portions 118a, 118b, 118c include a portion of the light transmission portion 126. However, the light transmission portion 126 may be entirely contained within one of the light coupling portion or the light emitting portions. Moreover, each of the light transmission portion, the light coupling portion and the light emitting portion may be formed separately. An interface 800 is created on the light coupling portion 124a that optically couples the light coupling portion 124a to a mating interface 802 provided on any one of the plurality of different types of light emitting portions 118a, 118b, and 118c. The interfaces 801, 802 may comprise mechanical connectors to secure the portions to one another and an optical gel or other medium may be used between the portions to optically couple the portions to one another. In this manner a single light coupling portion may be used with different types of light emitting portions and/or light transmission portions. For example, as shown in FIG. 19 the light emitting portion 118a may be substantially similar to the light emitting portion described with respect to FIGS. 4-8; the light emitting portion 118c may be substantially similar to the light emitting portion described with respect to FIG. 13; and the light emitting portion 118b may be similar to the light emitting portion of FIGS. 4-8 except that the light emitting portion 118b may be circular rather than rectangular. While examples of different types of light emitting portions are shown, it is to be understood that the light emitting portions may differ from one another in ways different than as specifically described. Moreover, different types of light coupling portions 124a, 124b may also be provided. For example light coupling portion 124a may be substantially similar to the light coupling portion described with respect to FIGS. 4-8; and the light emitting portion 124b may be substantially similar to the light emitting portion described with respect to FIG. 13. While examples of different types of light coupling portions are shown it is to be understood that the light coupling portions may differ from one another in ways different than as specifically described. For example, referring to FIGS. 15 and 17, the domed light emitting portions 518, 618 may be coupled to the same type of light coupling portion 542 at interfaces 902. The modular approach as described herein allows the number of components to be reduced where, for example, a single light coupling portion may be used with a variety of different types of light emitting portions to create different types of waveguides.

In some embodiments, different portions of the waveguide may be made of different materials to provide different portions of the waveguide with different optical properties. For example, the light emitting portions may be formed of glass while the light coupling portion may be formed of a different material such acrylic or silicone. In other embodiments the light extracting region may be formed of silicone while the remainder of the light emitting portion may be glass. Making different portions of the waveguide of different materials may be most easily performed where the light guide comprises separately made portions; however, even where the waveguide is an integral, one-piece waveguide, different materials may be used to create different portions of the waveguide. The different materials may comprise acrylic, polycarbonate, glass, molded silicone, other optical materials or combinations of such materials. Moreover, the materials may include particles, additives, or the like that alter the optical properties such that, for example, one portion of the waveguide may be made of acrylic and a second portion of the waveguide may be made of acrylic containing reflective or diffusive particles. In such an embodiment, the acrylic and acrylic containing particles are considered different materials. Other materials and in combinations other than as described herein may be used to create different portions of the waveguide having different optical properties.

The waveguide(s) 100 described herein may comprise additional features to assist in developing the target illumination distribution(s). The embodiments discussed herein may incorporate reflecting and/or diffusing surface coverings/coatings. The coverings/coatings may take the form of reflecting/diffusing coatings, paints, and/or sprays as applied to metals, plastics, papers, and/or films. Further, the coverings/coatings contemplated herein may take the form of reflecting/diffusing films and/or sheets including paper films, plastic films, paper sheets, plastics sheets, and/or metal sheets. The reflecting/diffusing films, coatings, paints, sheets, and/or sprays may have the same and/or different reflecting and/or diffusing properties. Further, the films, coatings, paints, sheets, and/or sprays may be applied to provide more or less coverage of the example waveguide(s). Still further, the films, coatings, paints, and/or sprays may be applied to particular parts while not being applied to other parts. The films, coatings, paints, sheets, and/or sprays may be applied during or after manufacture of the waveguide(s) 100, and before, during, and/or after the manufacture and/or assembly of the lighting systems. The films, coatings, paints, sheets, and/or sprays contemplated by this disclosure are referred to as coatings and films, although use of these terms referentially should not limit the materials/substances added to the waveguide.

Although specific embodiments have been shown and described herein, those of ordinary skill in the art appreciate that any arrangement, which is calculated to achieve the same purpose, may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A waveguide comprising:
   a light coupling portion having a first surface and a second surface, wherein the first surface defines a light coupling surface and is disposed parallel to the second surface;
   a first plurality of light coupling features arranged in rows and columns, each defining a cavity in the first surface to direct light into the light coupling portion;

a second plurality of light coupling features, each defining a cavity in the second surface to direct light into the light coupling portion;

a light emitting portion having a third surface and a fourth surface, the light emitting portion being disposed adjacent the light coupling portion such that the third surface is disposed adjacent the second surface; and a light transmission portion optically coupling the light coupling portion to the light emitting portion.

2. The waveguide of claim 1 further comprising a first light extraction feature for extracting light through the fourth surface.

3. The waveguide of claim 2 wherein the first light extraction feature is on the fourth surface.

4. The waveguide of claim 2 wherein the first light extraction feature comprises at least one of indents, depressions, facets or holes extending into the fourth surface.

5. The waveguide of claim 2 wherein the first light extraction feature comprises at least one of bumps, facets or steps rising above the fourth surface.

6. The waveguide of claim 2 further comprising a second light extraction feature for extracting light through a fifth surface, the fifth surface being disposed substantially perpendicular to the fourth surface.

7. The waveguide of claim 1 wherein the light coupling portion has substantially the same footprint as the light emitting portion.

8. The waveguide of claim 1 wherein the first surface, the second surface, the third surface and the fourth surface are substantially parallel to one another.

9. The waveguide of claim 1 wherein the fourth surface is a light emitting surface and the first surface is disposed substantially parallel to the fourth surface.

10. The waveguide of claim 1 wherein the light transmission portion is substantially annular.

11. The waveguide of claim 10 wherein light is directed radially inwardly from the light transmission portion into the light emitting portion.

12. The waveguide of claim 1 further comprising a second light transmission portion optically coupling the light coupling portion to the light emitting portion.

13. A modular waveguide system comprising:
a light coupling portion having a first interior surface and a first exterior surface, the first exterior surface comprising a first plurality of light coupling features and the first interior surface comprising a second plurality of light coupling features, wherein each light coupling feature defines a cavity and an interior face to direct light into the light coupling portion;

a first LED board comprising a first plurality of LEDs arranged in rows and columns, each LED emitting light into one of the first plurality of light coupling features;

a second LED board comprising a second plurality of LEDs arranged in rows and columns, each LED emitting light into one of the second plurality of light coupling features;

a first type of light emitting portion and a second type of light emitting portion each having a second interior surface and a second exterior surface, the second exterior surface defining a light emitting surface, wherein the first type of light emitting portion and the second type of light emitting portion each have a different configuration and are physically separate from the light coupling portion;

a light transmission portion configured to optically couple the light coupling portion to either one of the first type of light emitting portion and the second type of light emitting portion; and an interface formed between and connecting the light coupling portion and a selected one of the first type of light emitting portion and the second type of light emitting portion, the interface physically and optically coupling the light coupling portion and the selected one of the first type of light emitting portion and the second type of light emitting portion.

14. The modular waveguide system of claim 13 further comprising a light extraction feature for extracting light through the second exterior surface.

15. The modular waveguide system of claim 14 wherein the light extraction feature comprises at least one of indents, depressions, facets or holes extending into the second exterior surface and bumps, facets or steps rising above the second exterior surface.

16. The modular waveguide system of claim 13 wherein a footprint of the light coupling portion is substantially the same or less than a footprint of the first type of light emitting portion and the second type of light emitting portion.

17. The modular waveguide system of claim 13 wherein the light coupling portion is made of a first material and the first type of light emitting portion and the second type of light emitting portion are made of a second material, the first material being different than the second material.

18. The modular waveguide system of claim 17 wherein the first type of light emitting portion and the second type of light emitting portion are made of glass and the light coupling portion is made of at least one of acrylic and silicone.

19. The modular waveguide system of claim 13 wherein the first plurality of LEDs and the second plurality of LEDs are spaced such that a lumen power density is controlled to substantially reduce overheating without increasing a footprint of the waveguide.

* * * * *